United States Patent
Bodine et al.

(10) Patent No.: US 8,690,497 B2
(45) Date of Patent: Apr. 8, 2014

(54) HANDLE AND ATTACHMENTS FOR RIGHT ANGLE DRILL

(75) Inventors: Thomas J. Bodine, Glenwood, MD (US); Barry Edward Plato, Bel Air, MD (US); Joao Norona, Baltimore, MD (US); Kathy E. DiPasquale, Baltimore, MD (US); Gale Anthony Heslop, Carney, MD (US); James B. Watson, Fallston, MD (US)

(73) Assignee: Black & Decker Inc., Newark, DE (US)

( * ) Notice: Subject to any disclaimer, the term of this patent is extended or adjusted under 35 U.S.C. 154(b) by 1074 days.

(21) Appl. No.: 12/604,739

(22) Filed: Oct. 23, 2009

(65) Prior Publication Data

US 2010/0107423 A1    May 6, 2010

Related U.S. Application Data

(60) Provisional application No. 61/197,776, filed on Oct. 30, 2008.

(51) Int. Cl.
*B23B 45/00* (2006.01)

(52) U.S. Cl.
USPC .......................... 408/124; 408/241 R; 16/430

(58) Field of Classification Search
USPC ............ 408/8, 9; 173/178, 217, 162.1, 162.2, 173/170, 171, 168; 16/426, 422, 444, 445, 16/430
See application file for complete search history.

(56) References Cited

U.S. PATENT DOCUMENTS

| | | | |
|---|---|---|---|
| 3,077,547 A | 2/1963 | Metko | |
| 3,244,030 A * | 4/1966 | Godfrey | 173/217 |
| 3,456,740 A * | 7/1969 | Bronnert et al. | 173/109 |
| 3,990,523 A | 11/1976 | Schramm et al. | |
| 4,540,318 A * | 9/1985 | Hornung et al. | 408/9 |
| 4,667,749 A * | 5/1987 | Keller | 173/162.2 |
| 5,172,522 A * | 12/1992 | Jares | 451/259 |
| 5,201,146 A * | 4/1993 | Fushiya | 451/358 |
| 5,466,183 A * | 11/1995 | Kirn et al. | 451/359 |
| 5,687,483 A * | 11/1997 | Neubert et al. | 30/312 |
| 5,690,451 A | 11/1997 | Thurler et al. | |
| 5,832,611 A | 11/1998 | Schmitz | |
| 6,044,918 A * | 4/2000 | Noser et al. | 173/176 |
| 6,293,859 B1 * | 9/2001 | Fink et al. | 451/344 |
| 6,810,547 B2 * | 11/2004 | Hung | 15/28 |
| 8,006,778 B2 * | 8/2011 | Wiker et al. | 173/162.2 |
| 2004/0084194 A1 | 5/2004 | Fuchs | |
| 2005/0217440 A1 | 10/2005 | Koschel et al. | |
| 2006/0289183 A1 | 12/2006 | Schreiber | |

FOREIGN PATENT DOCUMENTS

| | | |
|---|---|---|
| EP | 0226644 | 7/1987 |
| EP | 1666182 | 6/2006 |
| EP | 1 736 284 A1 | 12/2006 |
| GB | 2297514 A | 8/1996 |
| GB | 2439435 A | 12/2007 |
| JP | 2001-328081 | 11/2001 |

* cited by examiner

*Primary Examiner* — Eric A Gates
*Assistant Examiner* — Paul M Janeski
(74) *Attorney, Agent, or Firm* — Harness, Dickey & Pierce, P.L.C.

(57) ABSTRACT

A power tool can utilize a handle that engages with a large portion of the housing and can distribute the stresses incurred by the handle over a larger area. The handle of the power tool can be a stick handle or a guard handle. The handle may be utilized to position sensors therein at positions that are remote from the working bit of the power tool. Accessory handles, such as a bail handle and a side handle, can be mounted to a single set of machined passages on the housing.

15 Claims, 9 Drawing Sheets

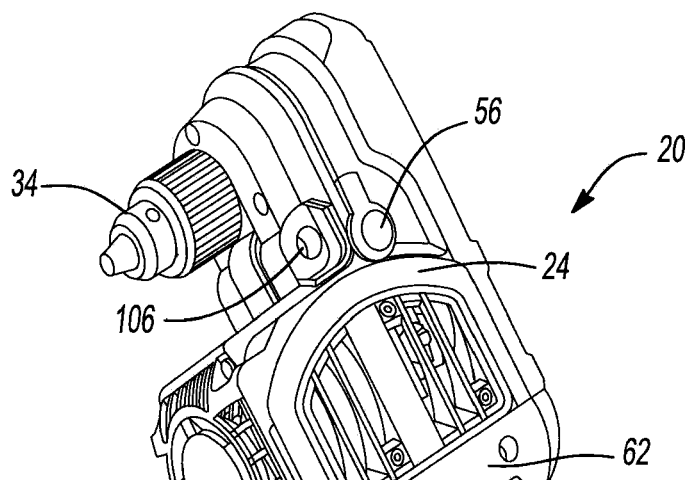
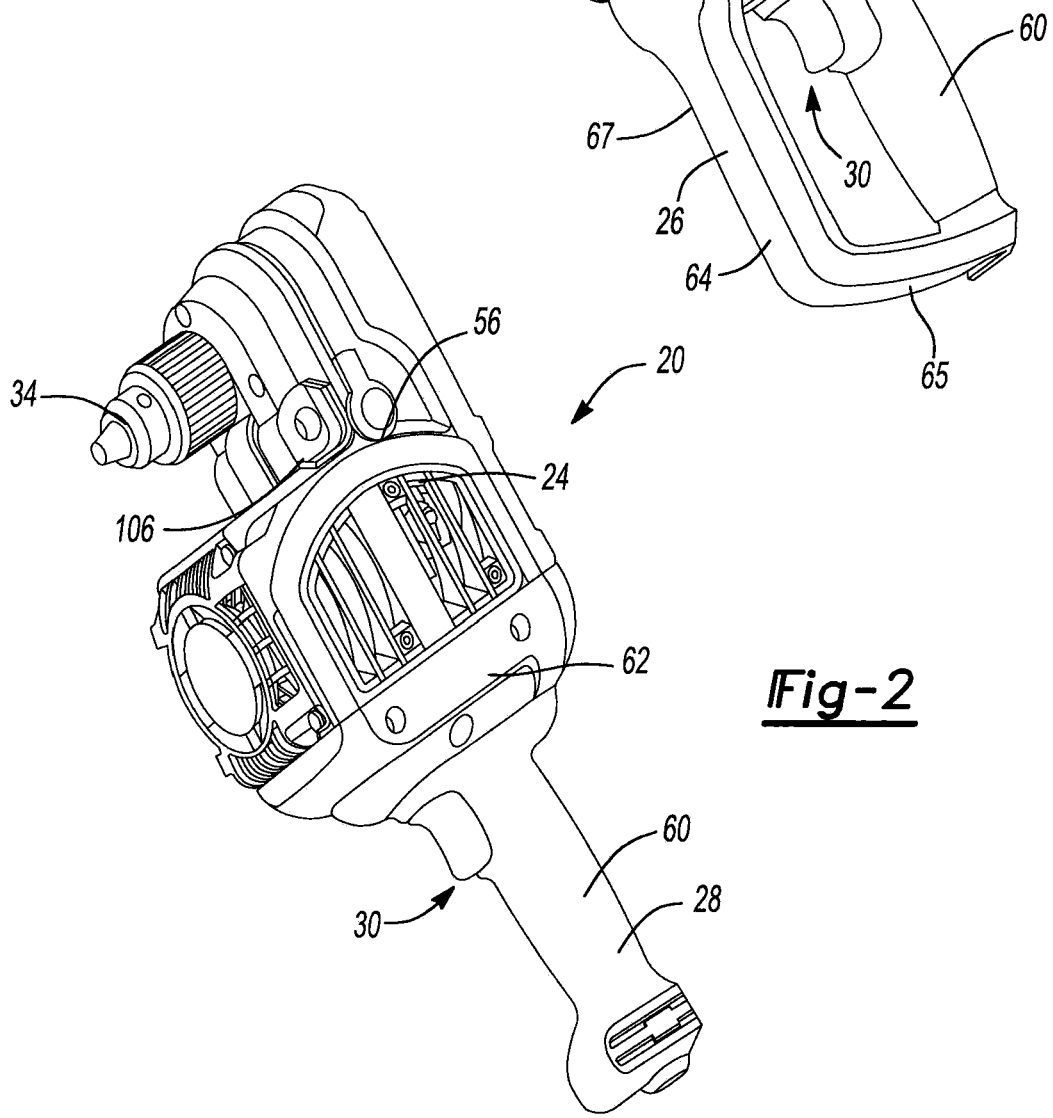
Fig-1
Fig-2

HANDLE AND ATTACHMENTS FOR RIGHT ANGLE DRILL

CROSS-REFERENCE TO RELATED APPLICATIONS

This application claims the benefit of U.S. Provisional Application No. 61/197,776, filed on Oct. 30, 2008. The entire disclosure of the above application is incorporated herein by reference.

FIELD

The present disclosure relates to handles and, more particularly, to handles and attachments that can be used on a power tool, such as a right angle drill.

BACKGROUND

This section provides background information related to the present disclosure which is not necessarily prior art.

Hand held power tools, such as drills and drivers, may include a housing and a handle attached thereto. Typically, the handle is a single stick-type handle that has a butt face attachment to the housing. This attachment results in a small footprint or mounting area for the handle on the housing. The power tool can generate high torque. The small footprint or mounting area for the handle on the housing can limit the distribution of the loading due to the high torque. Additionally, the power tool can be heavy and, being handheld, can be subject to being dropped. When dropped, the power tool may land on the handle or at an angle relative to the handle such that a large bending moment can occur at the location of the attachment of the handle to the housing. As stated above, the small footprint or mounting area, however, limits the ability of the handle to distribute the load and reduce the load concentration. As a result, the power tools can be subject to having the handle break when the power tool is subjected to large torque loading and/or dropped. Breaking the handle can make the power tool useless until a replacement handle is attached. Additionally, the need to purchase replacement handles increases the cost of ownership of the power tool. Thus, it would be advantageous if the handle loading could be spread out along a greater portion of the housing to reduce the stress concentrations during use and/or when the power tool is dropped to reduce the chance of the handle breaking. Additionally, the spreading of the stresses may also allow the use of different materials which may be more economical.

The power tools, such as drills or drivers, may generate large amounts of torque. As a result, when using the power tool, strong and violent forces may be incurred when the tool encounters an obstruction. For example, if a large diameter bit catches a nail or knot, the high torque produced by the power tool can cause it to rotate about the chuck axis. The operator may resist the rotation by holding onto the handle, or bracing it against a solid object. As a result, a large bending moment can occur at the location of the attachment of the handle to the housing due to the high torque. Additionally, when the power tool is a drill and a ship auger bit is being utilized, the auger bit can catch on a nail or similar feature, such as a knot. When this occurs, instead of the auger bit drilling through the material, it becomes a screw and can pull the power tool at a rapid pace toward the work piece. The handle, however, may not afford protection for the hand of a user. Additionally, the user's hand could possibly become trapped against the trigger and the work piece, thereby preventing the release of the trigger and de-energization of the power tool. As a result, the user may need to wait until the motor burns up or the power tool may need to be unplugged to de-energize the motor and allow the user to remove their trapped hand. Thus, it would be advantageous if the handle included features that distributed the load due to the high torque and/or to protect the user's hand. Additionally, it would be advantageous if the handle facilitated the allowing of a user to release the trigger regardless of the tool being trapped against a work piece.

In some power tools, it may be desirable to position sensors that relate to operation of the power tool at a position remote from the working bit. Thus, it would be advantageous to provide a power tool that provides various options for mounting of electronics or sensors therein to facilitate the operation of the sensor and control of the power tool.

The power tools may include an optional handle that can be attached to the housing at a location remote from the main handle. The optional handles can include a bail handle which is generally U-shaped and has ends that are attached to opposite sides of the housing. Additionally, a side handle can also be provided that projects outwardly from the housing and may be perpendicular to the housing. Typically, the housing includes two separate mounting holes on each side of the housing to attach the handles. One set of mounting holes are utilized to attach the bail handle on both sides of the housing, while the other set of holes is utilized to attach the side handle to either side of the housing. The two sets of mounting holes in the housing are machined holes that may be drilled and tapped during the manufacture of the housing. The use of two sets of mounting holes on each side, however, occupies space on the power tool and can interfere with the internal parts of the power tool, such as the transmission. As a result, the ability to provide a compact power tool can be limited by the necessity of having two sets of mounting holes in the housing. Additionally, machining of two separate holes on each side results in multiple machine operations and also takes time to produce the housing. It would be advantageous if the handles could utilize a single set of machined holes on either side of the housing which can thereby facilitate a more compact power tool and/or reduce the machining requirements and the costs and which may increase the manufacturing throughput.

SUMMARY

This section provides a general summary of the disclosure, and is not a comprehensive disclosure of its full scope or all of its features.

A power tool according to the present disclosure can advantageously utilize a handle that engages with a large portion of the housing. The large area of engagement can advantageously distribute the stresses incurred when the power tool is subjected to high torque loading and/or dropped over a larger area, thereby reducing the concentration of the stress. The handle of the power tool according to the present disclosure can be a stick handle or a guard handle. The guard handle can advantageously provide protection for a user's hand when operating the power tool. The handle may advantageously be utilized to position sensors therein at positions that are remote from the working bit of the power tool. Accessory handles, such as a bail handle and a side handle, can be advantageously mounted to a single set of machined passages on the housing. An adaptor can allow both the bail handle and the side handle to be simultaneously attached to the housing the single set of machined passages on the housing. The use of a single set of passages can allow for a more compact construction or size of the power tool, reduce the manufacturing costs, and/or allow for more ideal positioning of the optional handles.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1 and 2 are perspective views of a power tool according to the present disclosure with a guard handle and a stick handle, respectively;

Corresponding reference numerals indicate corresponding parts throughout the several views of the drawings.

DETAILED DESCRIPTION

Figure 3:
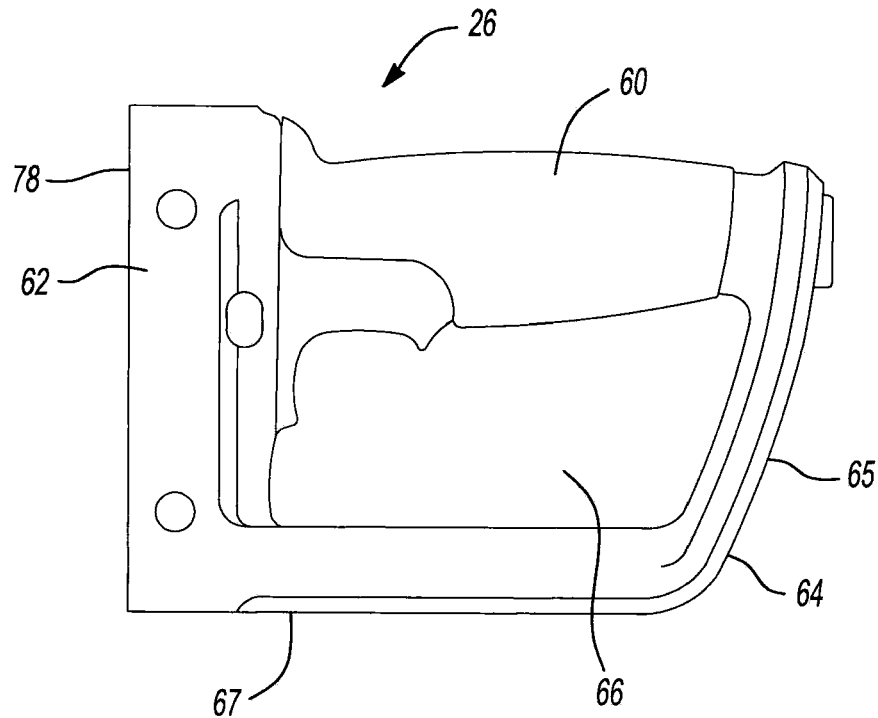
FIGS. 3 and 4 are perspective views of the handles of FIGS. 1 and 2, respectively.
Figure 4:
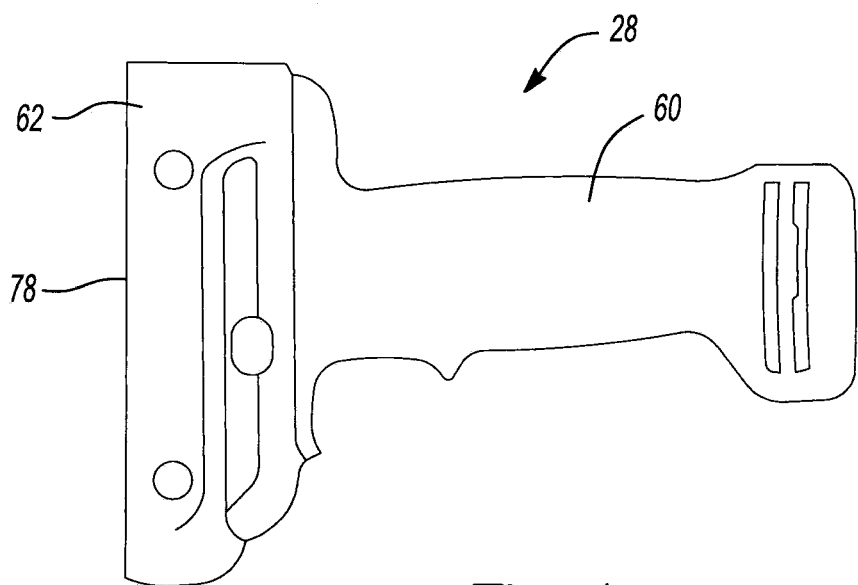
Figure 5A:
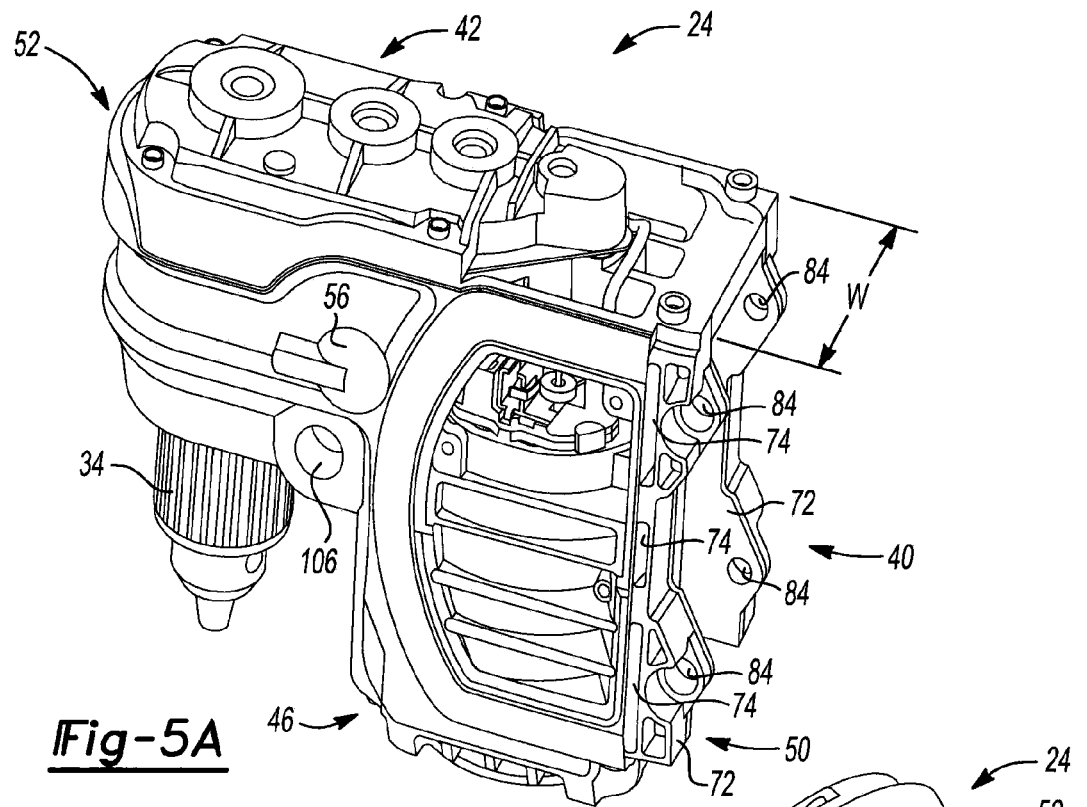
FIGS. 5A and 5B are perspective views of the housing of the power tool of FIGS. 1 and 2.
Figure 5B:
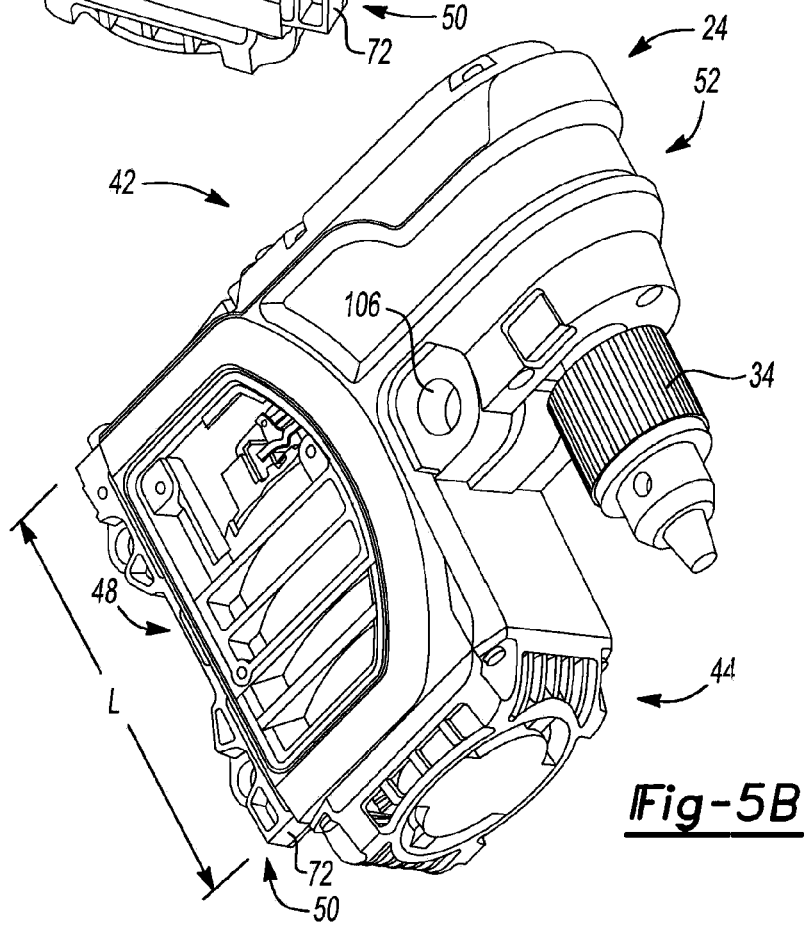
Figure 6A:
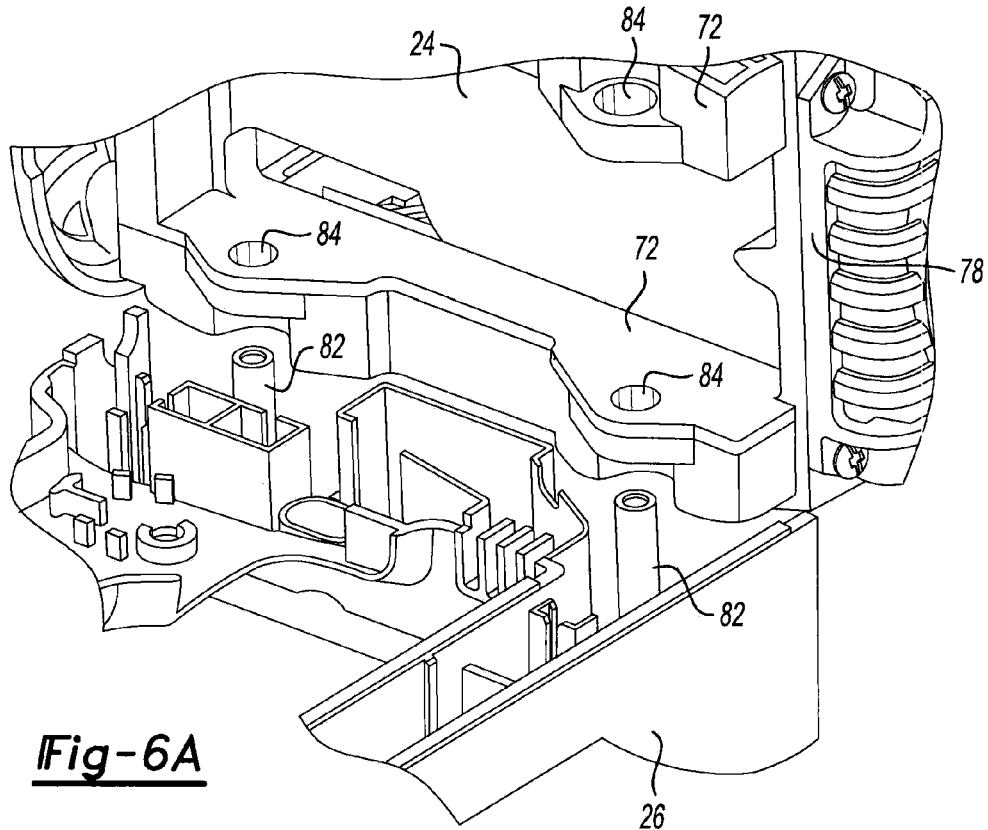
FIGS. 6A and 6B are fragmented perspective views of the power tool of FIG. 1 showing the attachment of one of the handle halves to the housing.
Figure 6B:
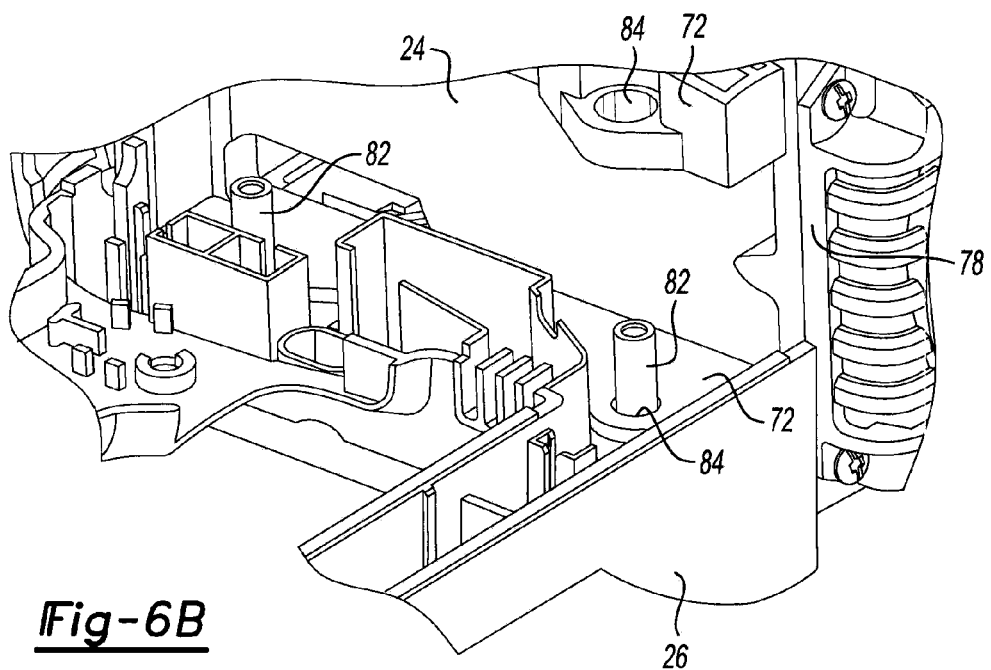
Figure 7:
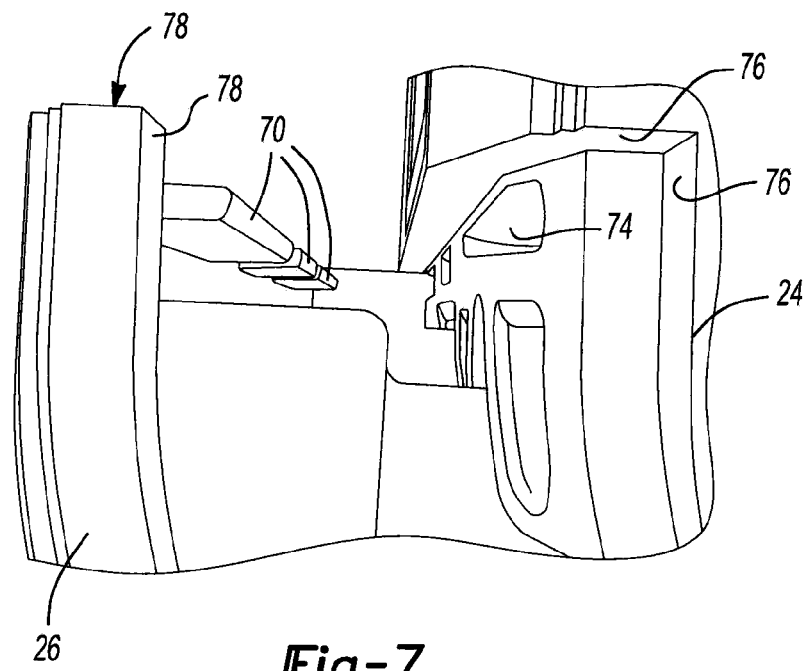
FIG. 7 is a fragmented perspective view of a portion of the handle and housing of the power tool of FIG. 1 showing the interlocking of the handle with the housing.
Figure 8:
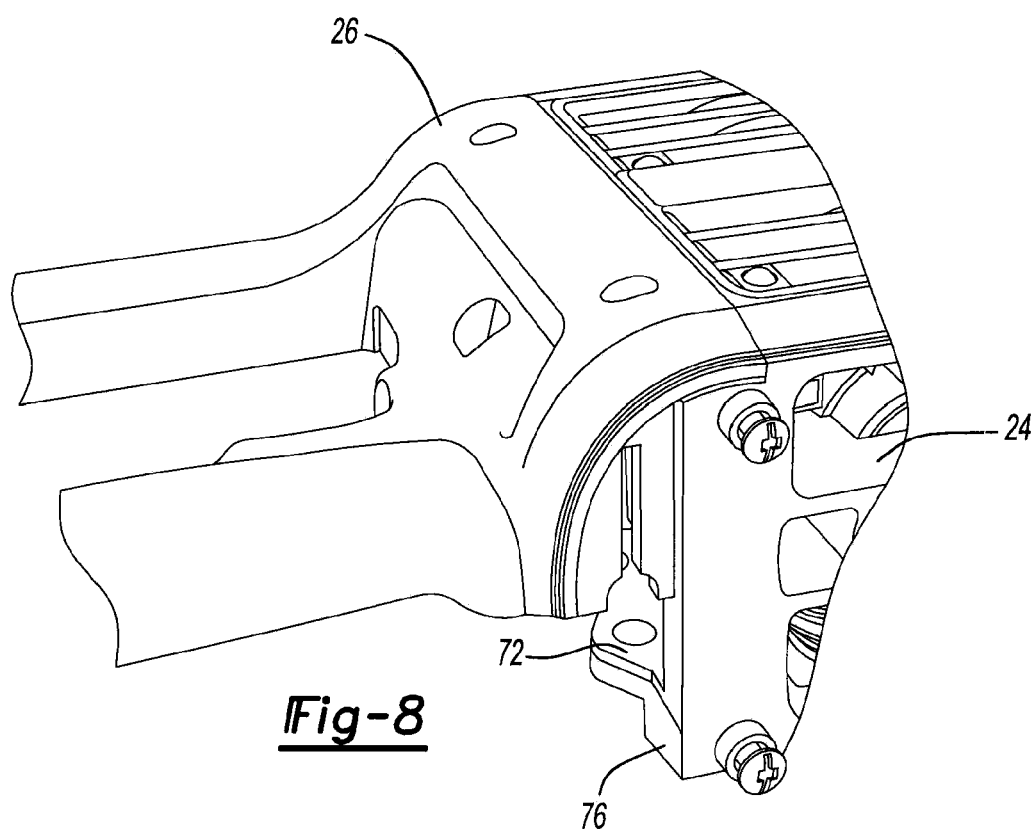
FIG. 8 is a fragmented perspective view of the power tool of FIG. 1 with one-half of the handle attached thereto.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to FIGS. 1-5 and 15, the present disclosure generally pertains to a power tool 20, such as a powered drill or driver by way of non-limiting example. In the exemplary drawings, power tool 20 is a right-angle drill. Power tool 20 includes a housing 24 to which a handle is attached. In the embodiments shown in FIGS. 1, 3, 13, and 15, power tool 20 has a guard handle 26 attached to housing 24 while in the embodiments shown in FIGS. 2 and 4, power tool 20 has a stick handle 28 attached to housing 24. Handles 26, 28 include a trigger assembly 30 that can activate power tool 20.

Housing 24 can contain, for example, a motor 32 that can drive a transmission 33 that ultimately provides a torque output to a drive spindle 36. Transmission 33 can include a plurality of gears or gear sets to achieve the desired torque and speed output of drive spindle 36 in response to operation of motor 32. A chuck assembly 34 can be attached to an end of drive spindle 36. Trigger assembly 30 can be retracted to energize motor 32 to drive transmission 33 and drive spindle 36. Chuck assembly 34 can be opened and closed to accept the various tools or bits.

Housing 24 includes a mounting surface 40 that can be generally rectangular in shape and extends between upper and lower surfaces 42, 44 and between left and right side surfaces 46, 48. Motor 32 is contained within a rear portion 50 of housing 24 while drive spindle 36 is contained in a front portion 52. Mounting surface 40 is adjacent to rear portion 50. Chuck assembly 34 extends from lower surface 44 of front portion 52. Transmission 33 is disposed in housing 24 and can extend in both rear portion 50 and front portion 52. A lever 56 can be disposed on left side surface 46 of housing 24. Lever 56 can be coupled to a shifting mechanism that changes the operation of transmission 33 and power tool 20 between first and second operating conditions. The first and second operating conditions can be related to a torque output and/or rotational speed of drive spindle 36.

Handles 26, 28 can each be a two-piece construction. For example, in FIGS. 3 and 4, the left side halves of handles 26, 28 are shown. The left sides of handles 26, 28 mount with the right halves, which can be mirror images of the left halves, of the handle to form the complete handle assembly which can be coupled to housing 24, as described below.

Figure 12:
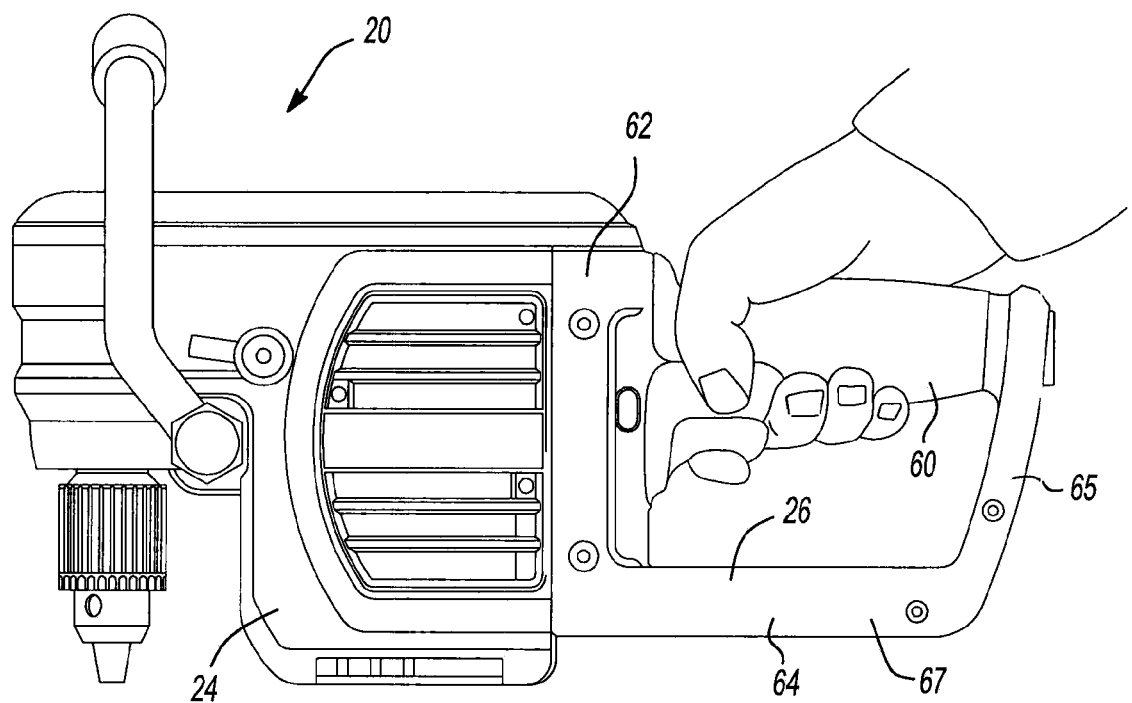
FIG. 12 is a view of a user gripping the handle of the power tool of FIG. 1 in an operable position.
Figure 13:
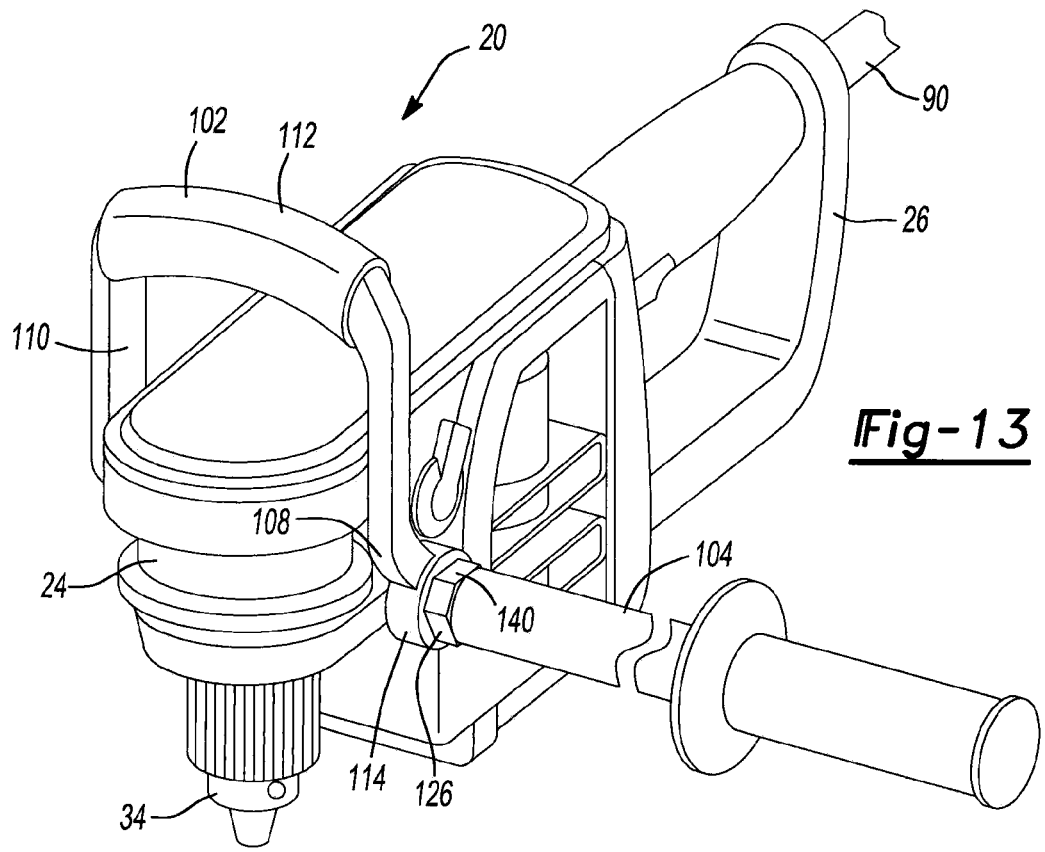
FIG. 13 is a perspective view of the power tool of FIG. 1 with the optional bail handle and side handle according to the present disclosure attached thereto.
Figure 14:
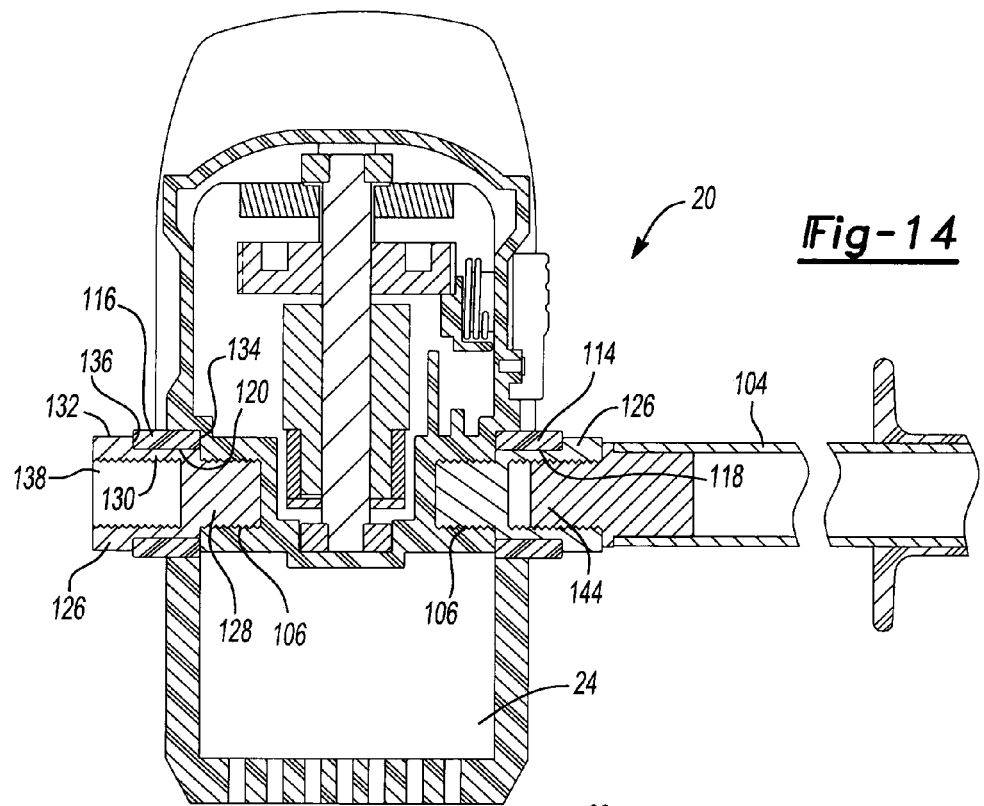
FIG. 14 is cross-sectional view of the power tool of FIG. 13 along line 14-14 showing the attachment of the side handle and the bale handle to the housing.
Figure 15:
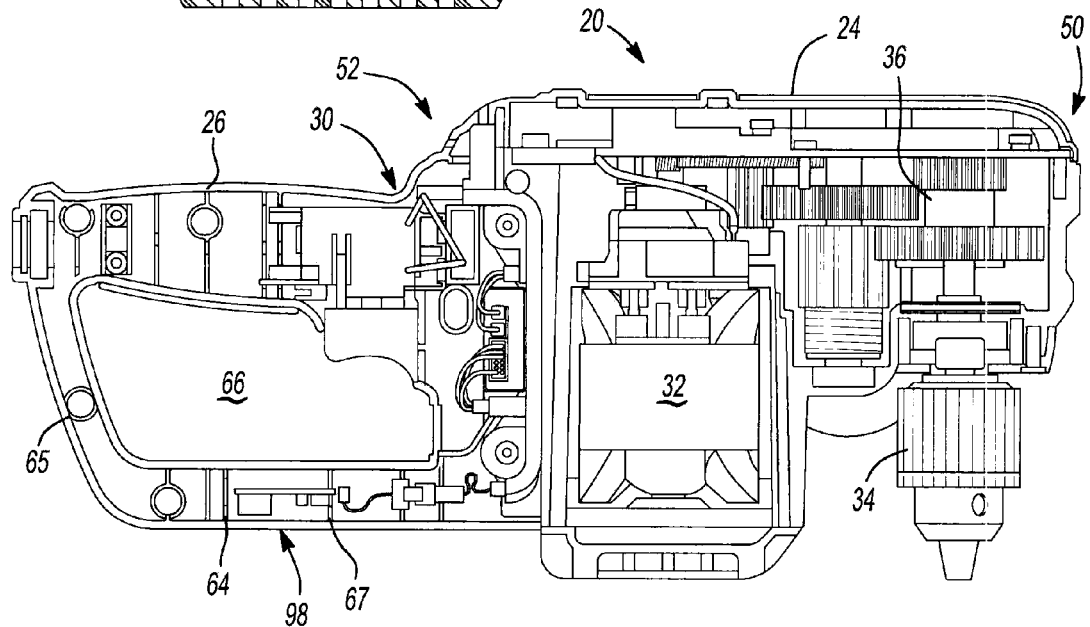
FIG. 15 is a side view of the power tool of FIG. 1 illustrating an exemplary layout within the power tool.

Handles 26, 28 each include a gripping portion 60 that facilitates gripping of power tool 20 by a user. Trigger assembly 30 is disposed adjacent gripping portion 60 to allow a user to energize power tool 20. Both handles 26, 28 include a mounting portion 62 that is configured to be attached to mounting surface 40 of housing 24, as described below. In guard handle 26, gripping portion 60 extends from an upper section of mounting portion 62 adjacent to upper surface 42 of housing 24 and also includes a guard portion 64 that extends from an end of gripping portion 60 to a lower section of mounting portion 62 adjacent lower surface 44 of housing 24. Guard portion 64 and gripping portion 60 form a protected opening 66 through which the hand of a user extends when operating power tool 20, as shown in FIG. 12. Guard portion 64 can be generally L-shaped and can include first and second sections 65, 67. Guard portion 64 can serve to provide additional protection for the hand of a user operating power tool 20. Specifically, when operating power tool 20, if the working bit were to grip the object being worked on and pull power tool 20 thereto, guard portion 64 may protect the user's hands from being crushed or injured during such an operation. Guard portion 64 may also allow the user to release trigger assembly 30 in such an event. Guard portion 64 can provide additional benefits, as described below.

Mounting portion 62 is configured to extend along the entire length L of mounting surface 40 between upper and lower surfaces 42, 44 and along the entire width W of mounting surface 40 between left and right side surfaces 46, 48. As a result, mounting portion 62 could be engaged with up to an entirety of the periphery of mounting surface 40. This large maximized interface area allows for forces imparted onto the handle (i.e., as a result of torque loading during use, such as when using the handle as a brace, and/or as a result of dropping) to be distributed over a large area. As a result, stress concentrations can be reduced and a propensity or likelihood of breaking power tool 20 can also be reduced.

The use of guard portion 64 in conjunction with gripping portion 60 facilitates the transferring of forces throughout mounting portion 62 in the event that power tool 20 having guard handle 26 is subjected to high forces on the handle. In particular, in the event that guard portion 64 experiences a force imparted therein, the force will be transferred to both the end of gripping portion 60 via section 65 and the lower section of mounting portion 62 via second section 67. In the event that a force is imparted on gripping portion 60, the force will be transferred to guard portion 64 and to the upper section of mounting portion 62. With this configuration, the forces can be distributed to both gripping portion 60 and guard portion 64 which subsequently transmit these forces to mounting portion 62. This transmitting of forces disperses the loading such that stresses are reduced in magnitude. Additionally, with mounting portion 62 extending along and up to an entire periphery of mounting surface 40 on housing 24, the stresses are further distributed throughout mounting portion 62 and housing 24. As a result, the propensity or chance of catastrophic failure or breaking of guard handle 26 is reduced.

Figure 11:
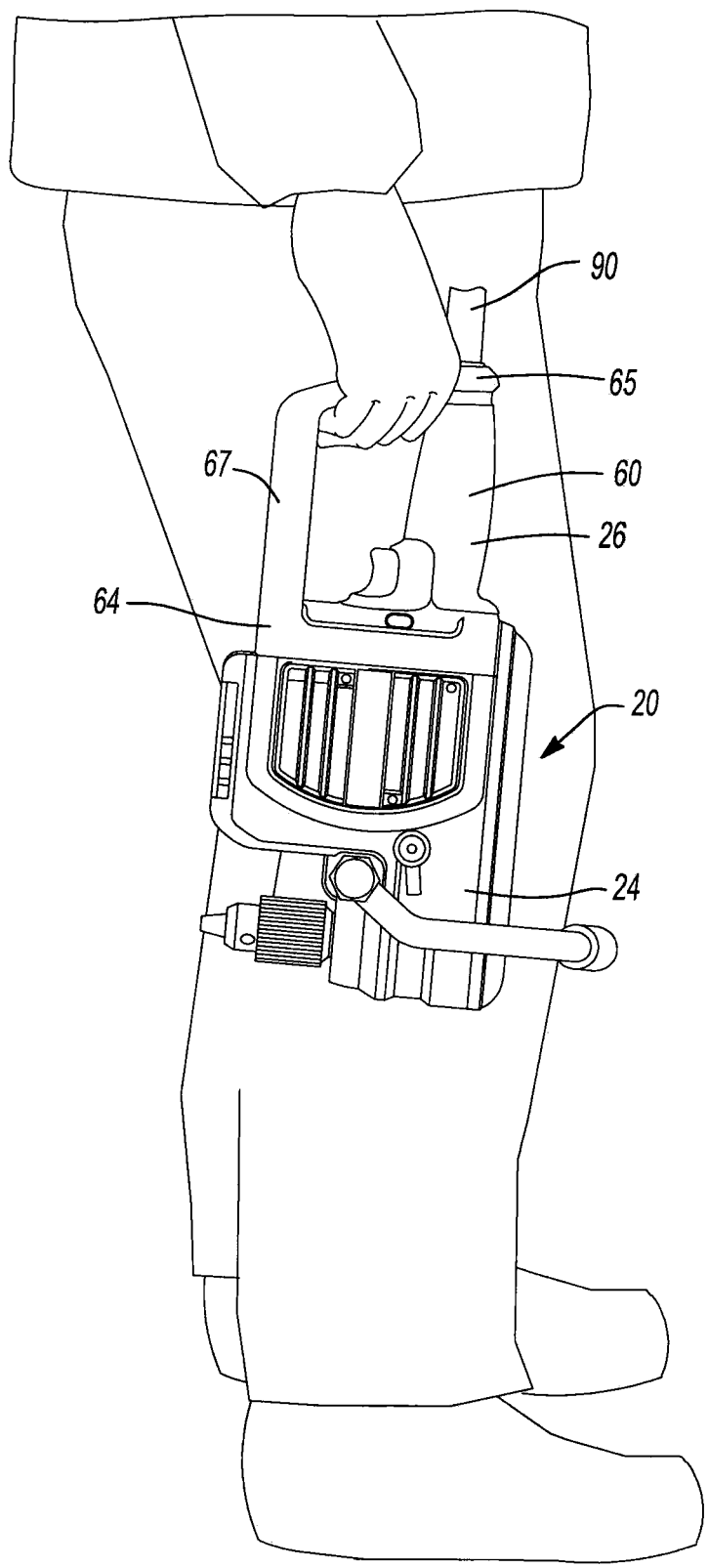
FIG. 11 is a view of a user transporting the power tool of FIG. 1.

Guard handle 26 also facilitates the carrying of power tool 20. In particular, as shown in FIG. 11, a user can easily carry power tool 20 by gripping first section 65 of guard portion 64. This configuration allows the heaviest part of power tool 20, housing 24, to be lower than guard handle 26. First section 65 can also be located directly above the center of gravity of power tool 20, thereby reducing the stress on the user when carrying power tool 20, since there will not be a moment arm. Thus, a user can easily transport power tool 20 by gripping guard handle 26.

In stick handle 28, gripping portion 60 can extend from a central section of mounting portion 62. The centralized extension of gripping portion 60 facilitates the transferring of forces to mounting portion 62. Specifically, in the event that a power tool 20 having stick handle 28 is exposed to high forces on the handle, the centralized gripping portion 60 can distribute the resulting stress across mounting portion 62. Additionally, with mounting portion 62 extending along up to the entire periphery of mounting surface 40 of housing 24, the resulting stress is distributed over a large area. As a result, the stress in any particular location can be reduced. The reduction in the stress can reduce the frequency of breakage that may occur when power tool 20 having stick handle 28 is exposed to high forces on the handle.

Referring now to FIGS. 5-10, the mounting of guard handle 26 to housing 24 is illustrated. It should be appreciated that mounting portions 62 of handles 26, 28 are the same such that the features of mounting portion 62 shown in these figures are also included in the mounting portion 62 of stick handle 28. Additionally, the benefits associated with the mounting techniques may be realized by both handles 26, 28.

To facilitate engagement of mounting portion 62 with housing 24, mounting portion 62 of each half of handle 26 includes a plurality of ribs 70 that extend from mounting portion 62 toward the other half. Housing 24 includes a pair of flanges 72 that extend along mounting surface 40 substantially the entire length between upper and lower surfaces 42, 44 adjacent to left and right side surfaces 46, 48. Flanges 72 include a plurality of recesses 74 that are spaced along flanges 72. Recesses 74 are configured to receive ribs 70 of mounting portion 62. Flanges 72 can include three recesses 74 and each half of handle 26 can include three ribs 70. The engagement of ribs 70 with recesses 74 interlocks mounting portion 62 with housing 24. Additionally, mounting surface 40 includes an engagement shoulder 76 adjacent to flanges 72 that engages with front end surface 78 of the handle. Shoulders 76 also extend between flanges 72 adjacent upper and lower surfaces 42, 44. The engagement of surface 78 with shoulder 76 in conjunction with engagement of ribs 70 with recesses 74 facilitates the distributing of loads along mounting portions 62 and mounting surface 40. This distribution can reduce stress that can occur as a result of high forces on the handle. The reduced stress can also reduce the propensity of the handle breaking when power tool 20 is exposed to high forces on the handle.

Mounting portion 62 can also include a pair of cylindrical-shaped bosses 82 that extend from one handle half toward the other handle half. Bosses 82 are received within openings 84 in flanges 72. The bosses 82 on one half of the handle align with the bosses 82 on the other half of the handle and include an opening 86 therein. Openings 86 can receive a fastener so that the two handle halves can be secured together with the fastener extending through and engaging with the bosses 82 on the two handle halves. The engagement of bosses 82 with openings 84 and flanges 72 further interlocks mounting portion 62 to mounting surface 40 of housing 24. Additionally, the engagement of ribs 70 with recesses 74 along with the engagement of bosses 82 with openings interlocks mounting portions 62 to housing 24 and inhibits removal of the handle from housing 24. This interlocking also facilitates the proper alignment of the handle on housing 24 during assembly. This configuration can also facilitate increased durability in that the fasteners used to secure the two handle halves together are loaded in shear when the handle is subjected to torque forces. As a result, the fasteners can rely upon their shear strength as opposed to relying upon the tensile strength of the fastener threads and/or the threads of the bosses that are used to secure the fasteners. In particular, when the fasteners are essentially subjected to tensile loading, the threads of the fastener and/or of the bosses 82 can be a weak point, thereby allowing failure of the handle. In contrast, the shear loading may enable the handle to sustain higher forces without breaking.

Figure 9:
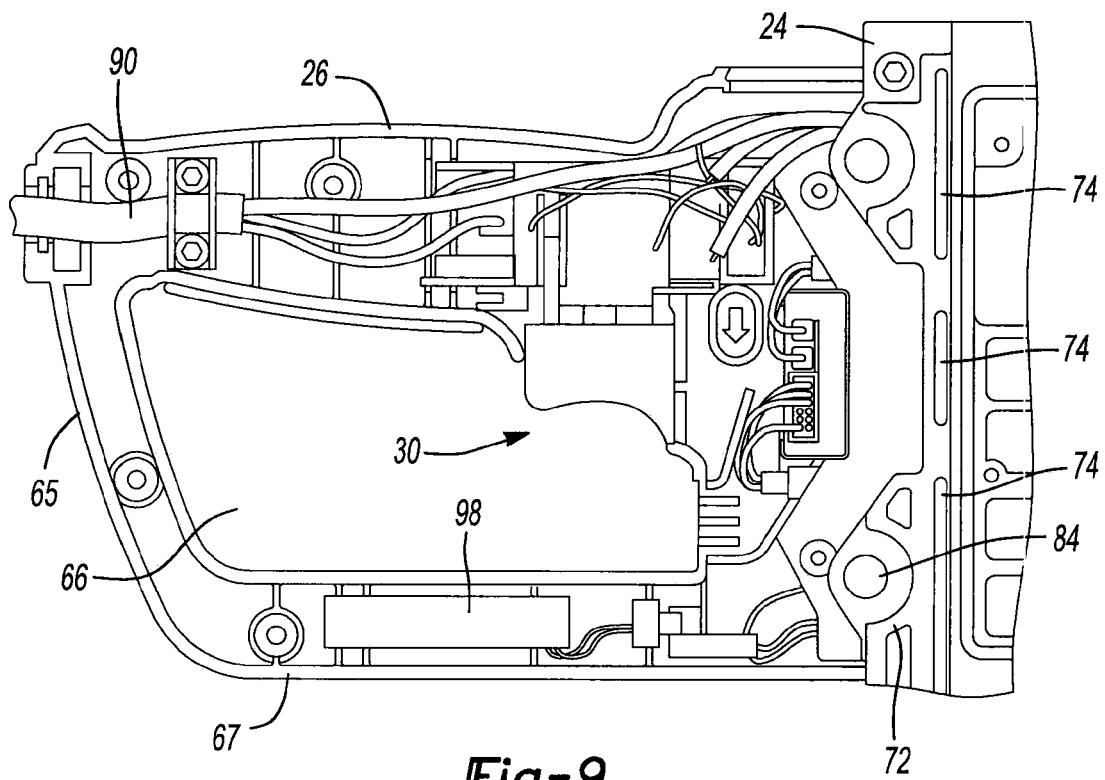
FIGS. 9 and 10 are fragmented plan views of the power tool of FIGS. 1 and 2, respectively, showing the assembly of the handle and the components disposed therein.
Figure 10:
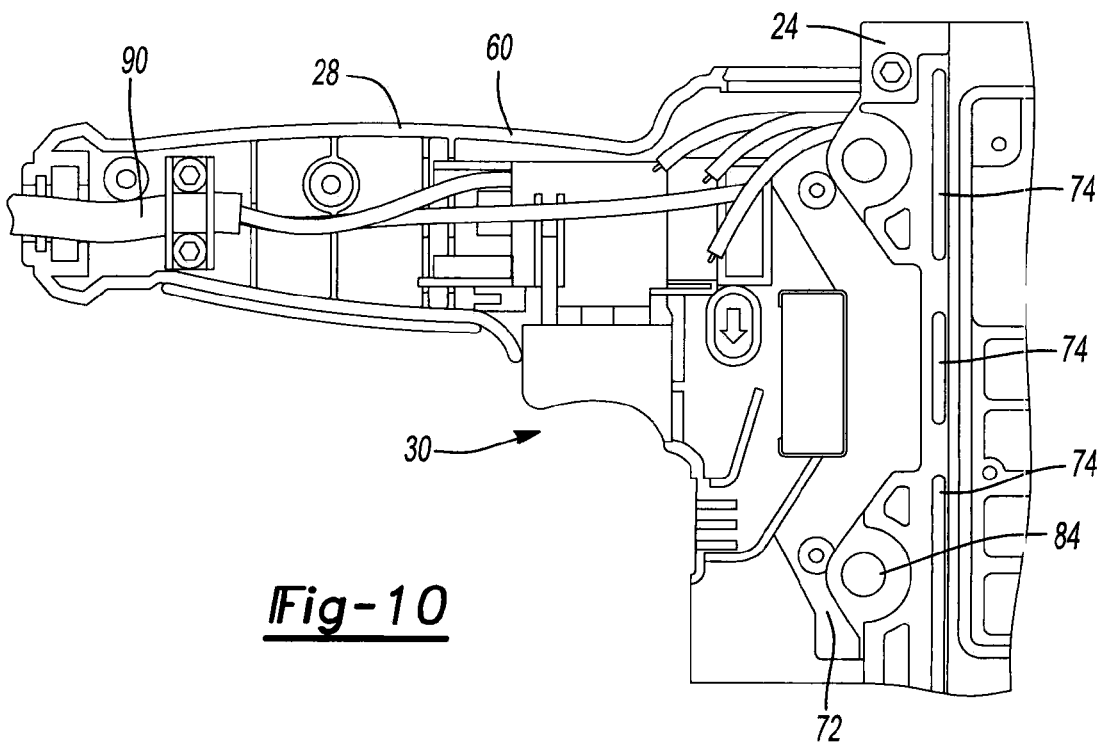

Referring now to FIGS. 9 and 10, the use of handles 26, 28 that are formed from two halves can facilitate the assembly of power tool 20. In particular, one of the halves of handle 26, 28 can be engaged with one of flanges 72 on housing 24, as shown. With this engagement, the routing of the power cord 90 and trigger assembly 30 through handle 26, 28 can be performed. With only one half of handle 26, 28 being utilized, the wiring and arrangement of the various components and assemblies can be easily secured in the proper orientation and, furthermore, secured to motor 32 and other features within housing 24. With these electrical connections made and the components secured in their proper position, the other half of handle 26, 28 can then be positioned to engage with the recesses 74 and openings 84 in flange 72 and aligned with the existing half of handle 26, 28. Fasteners can then be utilized to secure the two halves of handles 26, 28 together through engagement with various bosses 94 extending from the internal portions of the handle halves.

In addition to the benefits described above, guard handle 26 can also provide the additional benefit of providing additional room for disposing electronics for power tool 20 in the handle. For example, an electronic module 98 can be disposed in second section 67 of guard portion 64, as shown in FIG. 9. Module 98 may include one or more sensors. It may be desirable to locate sensors of module 98 in a position that is away from the power cord 90, trigger assembly 30, and motor 32 to reduce possible electro-magnetic interference or noise.

As a result, module 98 may advantageously be disposed in second section 67 of guard portion 64, as shown in FIG. 9.

It should be appreciated that other sensors and controllers can be disposed in guard portion 64. Thus, guard portion 64 can advantageously allow additional storage location for controller sensors and the like and may also allow the positioning of such controllers, sensors, and the like in a position that is away from power cord 90, trigger assembly 30, and motor 32.

Referring now to FIGS. 11-14, power tool 20 can include one or more optional handles. In particular, power tool 20 can include a bail handle 102 and/or a side handle 104. Bail handle 102 and side handle 104 can be attached to housing 24 through a single attachment feature disposed on left and right side surfaces 46, 48. The attachment feature 106 can be a threaded bore 106 that is machined into left and right side surfaces 46, 48 of housing 24 during manufacture of same. Bail handle 102 can be generally U-shaped and include first and second arms 108, 110 with a connecting section 112 extending therebetween. The ends of first and second arms 108, 110 can each include a collar 114, 116 that can each have an opening 118, 120 therethrough that aligns with bores 106 on respective left and right side surfaces 46, 48 of housing 24 with connecting section 112 extending across upper surface 42. Arms 108, 110 can be curved such that connecting section 112 extends across upper surface 42 in proximity to the rotational axis of drive spindle 36 and chuck assembly 34. Bail handle 102 can be attached to housing 24 with a pair of adapters 126.

Additionally, bail handle 102 can be secured to power tool 20 in a variety of different orientations. For example, bail handle 102 can be attached to power tool 20 in the orientation shown in FIG. 13. Bail handle 102 can also be rotated relative to power tool 20 and secured thereto in a different orientation so long as collars 114, 116 are aligned with openings 118, 120. The ability to position bail handle 102 in different orientations can aid the user in finding a gripping position that is suitable for the use to which power tool 20 is to be employed.

Adapters 126 include a threaded portion 128, a cylindrical portion 130, and a head portion 132. Adapters 126 also include a shoulder 134 at the interface of threaded portion 128 to cylindrical portion 130 and a shoulder 136 at the interface of cylindrical portion 130 and head portion 132. Head portion 132 can include a plurality of flats 140 that can facilitate rotation of adapter 126 by a wrench or the like. Threaded portion 128 is complementary to threaded bore 106 and can be received therein by relative rotation. Openings 118, 120 in collars 114, 116 are complementary to cylindrical portion 130 such that cylindrical portion 130 can be disposed within openings 118, 120. When attaching bail handle 102 to power tool 20, threaded portions 128 engage with threaded bores 106. Shoulder 134 can engage with left and right side surfaces 46, 48 surrounding bores 106 while shoulders 136 engage with the outer surface of collars 114, 116 surrounding openings 118, 120, respectively. In this manner, adapters 126 can be used to secure bail handle 102 to power tool 20.

Adapters 126 are configured to also allow side handle 104 to be attached thereto. Specifically, adapters 126 can include a threaded bore 138 that extends through head portion 132 and cylindrical portion 130. Side handle 104 can include a threaded portion 144 that is complementary to threaded bore 138. Side handle 104 can be attached to power tool 20 by engaging threaded portion 144 with threaded bore 138 and rotating side handle 104 relative to adapter 126. Side handle 104 can be attached to either the left or right sides of power tool 20 by engaging with adapter 126 attached thereto. Thus, adapter 126 allows both bail handle 102 and one or more side handles 104 to be attached to power tool 20 utilizing a single threaded bore 106 on the left and right side surfaces 46, 48 of housing 24. If desired, a pair of side handles 104 can be attached to both sides of power tool 20 in conjunction with bail handle 102.

Threaded bore 138 can have the same relative dimensions of bore 106 of housing 24. Additionally, threaded portion 144 of side handle 104 can have the same relative dimensions of threaded portion 128 of adapters 126. When this is the case, side handle 104 can be attached directly to housing 24 without the use of adapter 126. Specifically, threaded portion 144 can be engaged with threaded bore 106 and side handle 104 rotated relative to housing 24 to attach side handle 104 to housing 24. In this case, bail handle 102 is not utilized.

Thus, power tool 20 can utilize both a bail handle 102 and side handle 104 simultaneously and can allow the attachment thereto through the use of a single threaded bore 106 on the left and right side surfaces 46, 48 of housing 24. If desired, bail handle 102 can be used without side handle 104 with adapters 126 securing bail handle 102 to housing 24. If desired, one or more side handles 104 can be used without bail handle 102 by directly engaging threaded portion 144 of side handle 104 with threaded bore 106 in housing 24. Thus, the use of adapters 126 can allow for a plurality of arrangements for an optional bail handle 102 and side handle 104 for use on a power tool 20. Additionally, a single threaded bore 106 on each of the left and right side surfaces 46, 48 of housing 24 can be utilized, thereby reducing the requirement for two separate threaded bores on each side of the housing. The use of a single threaded bore 106 on each of the left and right side surfaces 46, 48 of housing 24 can advantageously allow for a more compact housing 24. In particular, the use of a single threaded bore 106 on each side allows for additional space for the internal components of housing 24 than may be available if two or more threaded bores are required on each side. Moreover, the use of a single threaded bore 106 on the left and right side surfaces 46, 48 of housing 24 can allow for the locating of threaded bore 106 to be at a position that maximizes the benefit of using bail handle 102 and/or side handle 104. That is, the location can be selected so that controlling of power tool 20 is facilitated along with resisting the torque generated thereby. This capability may allow easier or more precise control of power tool 20 and may also prevent or reduce the chance of out-of-control operation.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A hand-held power tool comprising:
    a housing having mounting surface that defines an entire side of the housing;
    a pair of flanges protruding from the mounting surface, each flange extending substantially along a periphery of one of two opposing sides of the mounting surface, each flange having at least one through opening and a plurality of recesses formed therein;
    a motor disposed in the housing; and
    a handle assembly having a mounting portion engaged along an entirety of a periphery of the mounting surface when attached to the housing, the handle assembly formed of two handle members, each handle member includes a gripping portion that extends away from an upper section of the mounting portion and a guard portion that extends away from a lower section of the mounting portion, the guard portion being substantially parallel with the gripping portion to form an opening therebetween, each handle member further includes a plurality of ribs and at least one boss projecting inward, such that the plurality of ribs engage with the plurality of recesses and the boss extends into the through opening of an adjacent flange to interlock the handle member to the housing.

2. The hand-held power tool of claim 1 further comprising a plurality of fasteners holding the handle assembly together thereby attaching the handle to the mounting surface, the fasteners extending substantially parallel to the mounting surface such that the fasteners are subjected primarily to shear loading when a torque is applied to the handle.

3. A hand-held power tool comprising:
a housing having a primary handle mounting surface and a secondary handle mounting feature consisting of a pair of bores disposed on opposite sides of the housing;
a motor disposed in the housing;
a drive spindle disposed in the housing and coupled to the motor;
a primary handle fixedly coupled to the primary handle mounting surface;
a pair of adaptors, each adaptor in the pair of adaptors selectively couples to one of the bores in the housing;
a first secondary handle having U shape with a pair of spaced apart legs and an aperature formed in a distal each of each leg, wherein each adaptor in the pair of adaptors passes through an aperature in one of the two legs, thereby attaching the first secondary handle to the housing, the first secondary handle being a bail handle; and
a second secondary handle having a single attachment feature operable to selectively attach the secondary handle to one of the adaptors in the pair of adaptors, the second secondary handle being a side handle.

4. The hand-held power tool of claim 3, wherein the single attachment feature of the side handle can engage with either one of the bores and the adaptors to selectively attach the side handle to the housing.

5. The hand-held power tool of claim 4, wherein the bores are threaded, the legs on the bail handles each have an opening therethrough that aligns with the bores, the adaptors each have a threaded extension that engages with the threaded bores to selectively attach the bail handle to the housing, the adaptors each have a threaded bore, and the side handle attachment feature is a threaded projection that engages with either threaded bore of the adaptors to selectively attach the side handle to the housing.

6. The hand-held power tool of claim 5, wherein the threaded bores in the housing and the threaded bores in the adaptors are substantially similar and the threaded extension on the adaptors and the threaded projection on the side handle are substantially similar such that the threaded projection on the side handle can be directly engaged with one of the threaded bores in the housing to selectively attach the side handle directly to the housing.

7. The hand-held power tool of claim 5, wherein the bail handle and side handle are both selectively attached to the housing with the adaptors and both the bail handle and side handle can be simultaneously attached to the housing.

8. A hand-held power tool comprising:
a housing having a primary handle mounting surface and a secondary handle mounting feature consisting of a pair of bores disposed on opposite sides of the housing;
a motor disposed in the housing;
a drive spindle disposed in the housing and coupled to the motor;
a primary handle fixedly coupled to the primary handle mounting surface;
a first secondary handle having a pair of spaced apart legs selectively attached to the opposite sides of the housing using the pair of bores, the first secondary handle being a bail handle; and
a second secondary handle having a single attachment feature selectively attached the second secondary handle to the housing using either one of the bores, the second secondary handle being a side handle; wherein the bail handle and the side handle are attached simultaneously to the housing.

9. The hand-held power tool of claim 8 further comprises a pair of adaptors engaging with the pair of bores, the adaptors selectively attaching the bail handle and the side handle to the housing.

10. The hand-held power tool of claim 9, wherein the bores are threaded, the legs on the bail handles each have an opening therethrough that aligns with the bores, the adaptors each have a threaded extension that engages with the threaded bores to selectively attach the bail handle to the housing, the adaptors each have a threaded bore, and the side handle attachment feature is a threaded projection that engages with either threaded bore of the adaptors to selectively attach the side handle to the housing.

11. The hand-held power tool of claim 10, wherein the threaded bores in the housing and the threaded bores in the adaptors are substantially similar and the threaded extension on the adaptors and the threaded projection on the side handle are substantially similar such that the threaded projection on the side handle can be directly engaged with one of the threaded bores in the housing to selectively attach the side handle directly to the housing.

12. The hand-held power tool of claim 8 wherein the housing having mounting surface that defines an entire side of the housing, a pair of flanges protruding from the mounting surface, each flange extending substantially along a periphery of one of two opposing sides of the mounting surface, each flange having at least one through opening and a plurality of recesses formed therein; and a handle assembly having a mounting portion engaged along an entirety of a periphery of the mounting surface when attached to the housing.

13. The hand-held power tool of claim 12 wherein the handle assembly is formed of two handle members, each handle member includes a gripping portion that extends away from an upper section of the mounting portion and a guard portion that extends away from a lower section of the mounting portion, the guard portion being substantially parallel with the gripping portion to form an opening therebetween, each handle member further includes a plurality of ribs and at least one boss projecting inward, such that the plurality of ribs engage with the plurality of recesses and the boss extends into the through opening of an adjacent flange to interlock the handle member to the housing.

14. The hand-held power tool of claim 1 wherein the housing having a secondary handle mounting feature comprised of a pair of bores disposed on opposite sides of the housing, a first secondary handle having a pair of spaced apart legs selectively attached to the opposite side of the housing using the pair of bores.

15. The hand-held power tool of claim 14 further comprises a second secondary handle having a single attachment feature selectively attaching the second secondary handle to the housing using one of the bores, such that the first and second secondary handles are attached simultaneously to the housing.

* * * * *